(No Model.) 2 Sheets—Sheet 2.
D. BOLLINGER.
HORSE HAY RAKE.
No. 390,437. Patented Oct. 2, 1888.
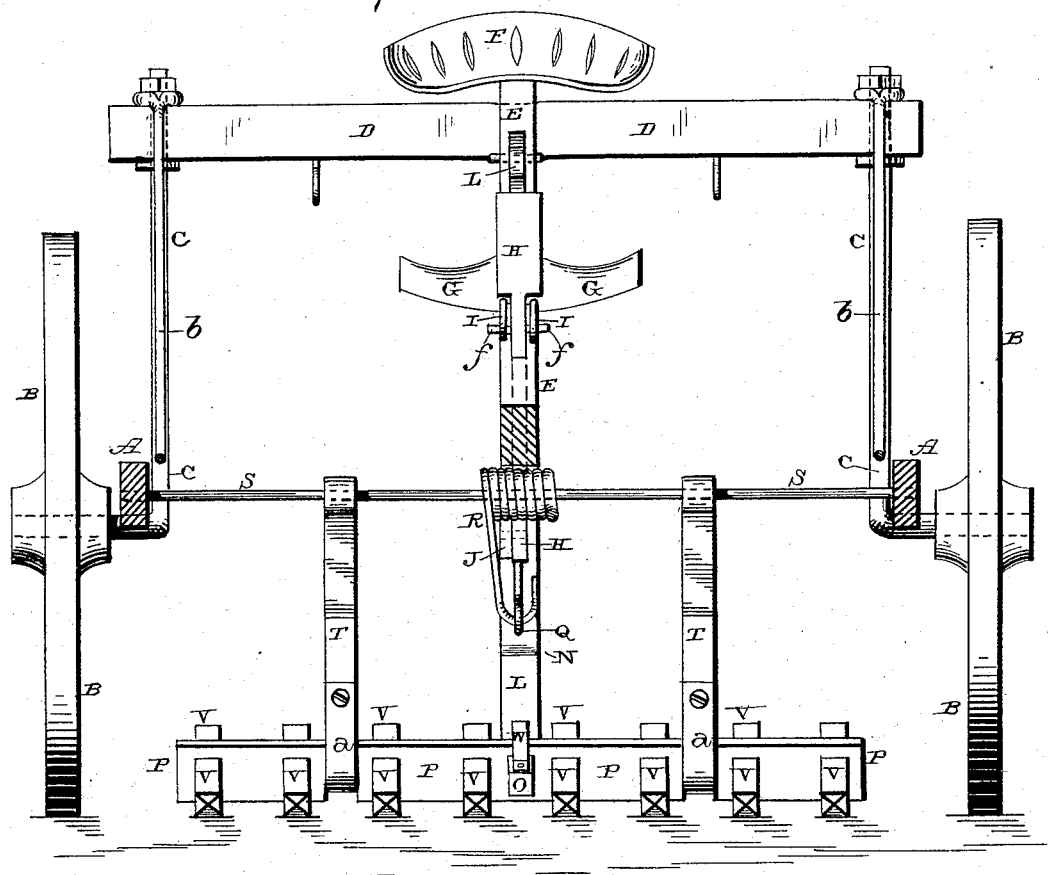
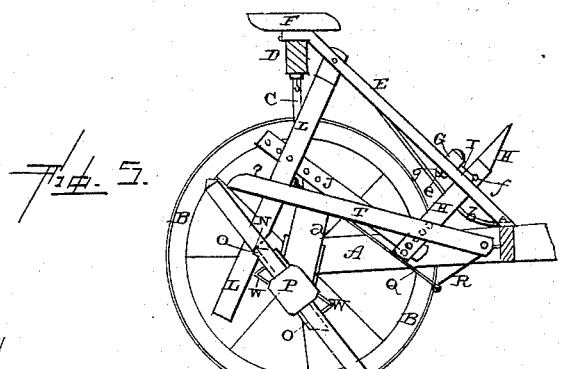
Witnesses.
L. K. Gardner
Wm H Babcock
Inventor.
Danl Bollinger,
per F. A. Lehmann,
Atty.

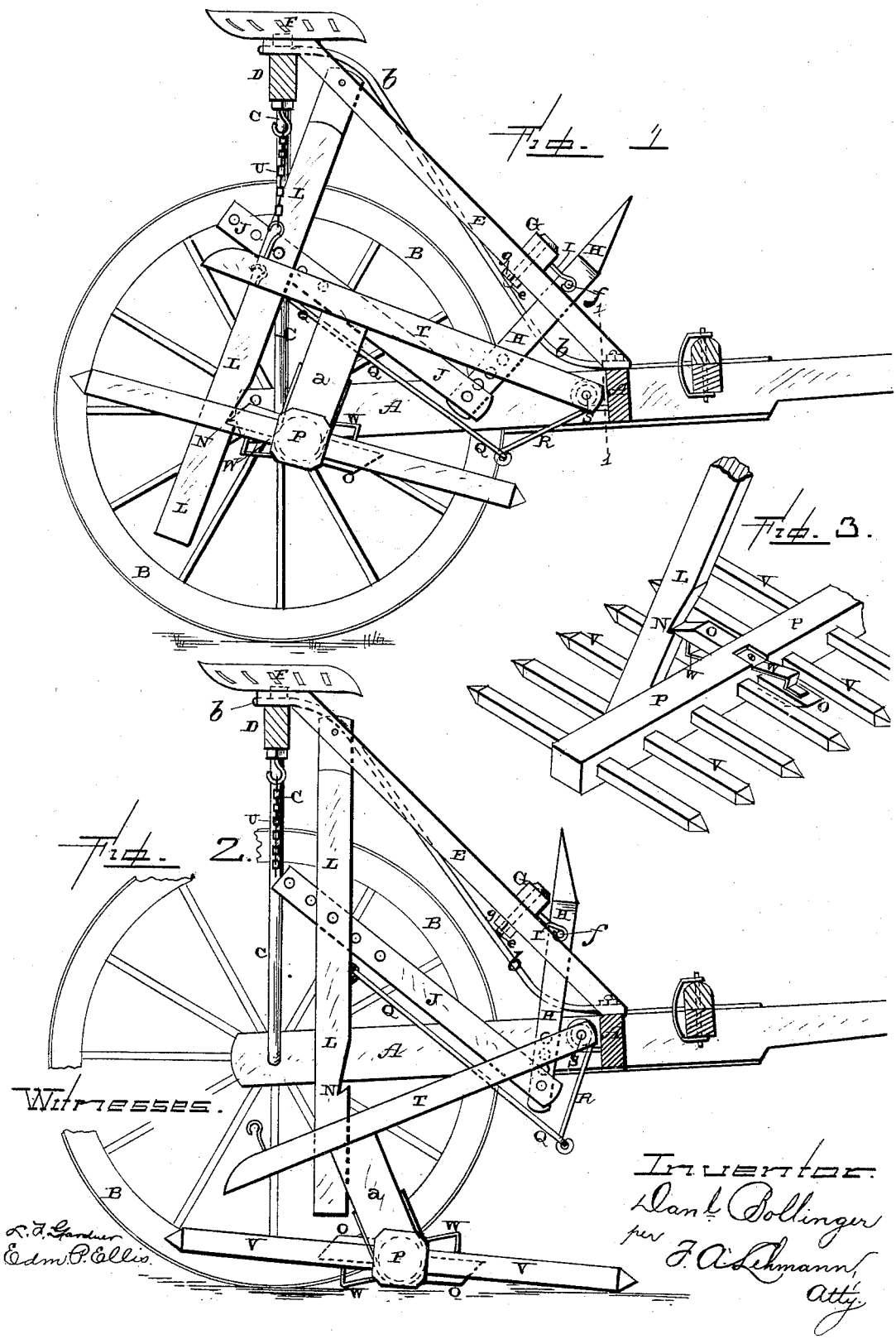

UNITED STATES PATENT OFFICE.

DANIEL BOLLINGER, OF NEW MADISON, OHIO.

HORSE HAY-RAKE.

SPECIFICATION forming part of Letters Patent No. 390,437, dated October 2, 1888.

Application filed October 28, 1887. Serial No. 253,597. (No model.)

*To all whom it may concern:*

Be it known that I, DANIEL BOLLINGER, of New Madison, in the county of Darke and State of Ohio, have invented certain new and useful Improvements in Horse Hay-Rakes; and I do hereby declare the following to be a full, clear, and exact description of the invention, such as will enable others skilled in the art to which it pertains to make and use it, reference being had to the accompanying drawings, which form part of this specification.

My invention relates to an improvement in horse hay-rakes; and it consists in the combination of the frame-work provided with stub-axles, and which is supported upon driving-wheels; pivoted supporting-bars, which are adapted to be suspended when the rake is being moved from place to place; the revolving rake, which is journaled in the supporting-bars; the spring-actuated notched trip-rod, which engages with suitable catches upon the rake-head, and the treadle and connecting-rod connected thereto, all of which will be more fully described hereinafter.

The object of my invention is to connect a revolving rake-head to a frame which is mounted upon wheels, and to provide the frame with suitable attachments whereby the rake-head can be suspended when being moved about and then dropped to the ground by the movement of the treadle.

Figure 1 is a side elevation of a rake-head embodying my invention, one side of the frame and the near driving-wheel being removed, the rake-head being shown in a suspended position. Fig. 2 is a similar view showing the rake-head dropped down. Fig. 3 is a perspective of the central portion of the rake-head, showing the catch O in engagement with the notch and the trip-lever L. Fig. 4 is a front elevation of a rake, the front portion of the frame being cut away on the dotted lines 1 1 of Fig. 1. Fig. 5 is a view of Fig. 1, the points of the teeth on the ground.

A represents a suitable frame-work, which is supported at its rear ends by the two driving-wheels B. Secured in this frame-work A are the supports C, which have their lower ends to extend beyond the sides of the frame and form stub-axles for the wheels B. To the upper ends of the supports C is secured the cross-beam D, which extends across the machine and connects its two sides rigidly together, which beam is braced rigidly in position at each end by means of a brace-rod, b, which has its front end secured to the front of the frame. Secured both to the center of this cross-beam and the frame A is the inclined slotted bar E, upon the upper end of which the seat F is mounted. This bar E is slotted, so that the foot-piece G and the foot-lever H, connected thereto, can be adjusted back and forth to suit the length of the driver's legs. The foot-piece serves as a support for the driver's feet and helps to support him in position upon the seat F. This piece G is secured in position by means of a clamping-bolt, which passes down through the piece G and the slot in the bar E and receives a nut, g, upon its lower end. By loosening this nut g the foot-piece G can be adjusted up and down upon the slotted bar E at will.

Passed down through the slot in the bar E is a foot-lever, H, which is fastened near its upper end to the foot-piece G by means of the hooks or other similar devices, I, and a pin, f, which passes through the lever, and which lever has a series of holes made through its lower end, so that the connecting-rod J can be adjusted thereon to suit the position into which the lever H has been adjusted. The connecting-rod J has a series of holes through its rear end, so that it can be adjustably attached to the trip-rod L. This trip-rod L is pivoted at its upper end in the slot in the inclined rod E, and is provided with a notch, N, in its front side, near its lower end, so as to engage with one of the catches O on the rake-head P when the rake-head is held in a raised position by means of the chains U. Connected to the trip-rod L is a rod, Q, which has its front end fastened to the lower end of the helical spring R, which is fastened to the rear side of the front portion of the frame A. This spring R and the connecting-rod serve to keep the trip-rod L drawn forward, so that it will automatically engage with one of the catches O on the rake-head whenever the rake-head is raised by hand through the levers T. The driver upon the seat F has but to press forward upon the upper end of the foot-lever H, when the trip-rod L will be forced backward to allow one of the projections o on the rake-head to engage with the notch N after the rake-head has been raised. This rod L does not have to be operated when the rake is dropped into the position shown in Fig. 2, for it performs no other function than to keep the rake-teeth in a horizontal position. As soon as the pressure of the foot is removed from the lever H, the trip-rod L is instantly drawn forward into position again by the spring R.

Pivoted upon the rod S, which extends through the front part of the frame A, are the two supporting-levers T, which have secured to their under sides, near their rear ends, the vertical hangers a, upon the lower ends of which is journaled the rake-head P. When the rake is in use, it assumes the position shown in Fig. 2; but when the rake is being moved from place to place the levers T are raised and held supported by the short chains U, which hang downward from the under side of the cross-bar D. While in this raised position one of the catches O, which project from opposite sides of the rake-head, engages with the notch N in the trip-rod L, to hold the teeth in a horizontal position. While held in this raised horizontal position the points of the teeth are prevented from coming in contact with anything which would have a tendency to cause the rake to revolve. When the rake is to be brought into use, the driver loosens the chains U from their hooks on the under side of the cross-beam D and operates the trip-lever, and the rake drops flat on the ground, as shown in Fig. 2.

The rake-head P is provided with teeth V, which extend from opposite sides, and in between the two central teeth the catches O are placed. Secured to the opposite side of each of these catches and to the rake-head is a support, W, which rests upon the ground as the rake-head is drawn along, and which serves to hold the rake-head at such an angle as to bring the points of the front set of teeth into an operative position by raising the rear points of the teeth upward and constantly depressing the front ones. While the rake is in operation the levers T allow the head to drop freely downward upon the ground, and when the rake is raised, as shown in Fig. 1, they support it above the ground in such a way that its teeth are not brought into play.

When the driver arrives at the field where the rake is to be used, he has but to move the rake into any desired position, unhook the chains U, and then operate the trip-rod L through the foot-lever H, and the rake will at once drop to the ground and assume an operative position.

Having thus described my invention, I claim—

1. The combination, in a horse hay-rake supported upon driving-wheels, of upright supports C, having their lower ends secured to the frame, stub-axles secured to the frame, on which the driving-wheels are placed, the cross-beam D, secured to the upper ends of the supports, the rake-supporting levers T, pivoted at their front ends to the frame and having the vertical depending arms or hangers a, chains U, for supporting the levers in a raised position, the rake-head journaled in the lower ends of the said arms and provided with catches to engage a trip-lever, said trip-lever being pivoted at its upper end and depending from an inclined bar secured to the frame at its front end and to the beam D at its rear end, the lever H, pivoted to said inclined bar, the connecting-rod which connects the lever H and the trip-rod together, and the spring secured to the front of the beam for drawing the trip-rod forward into engagement with the catches, and a connection between the spring and the trip-rod, substantially as shown.

2. The combination, in a horse hay-rake, of the frame, the short axles upon which the driving-wheels are placed, the cross-bar D, secured to the frame by the upright supports and suitably braced in position, the inclined slotted bar E between the cross bar and the frame, having the seat F at its upper end and the foot-piece G secured thereto, the lever H, connected to the foot-piece and passing through the slot in the said bar E, so as to be adjusted thereon, the connecting-bar J, the spring-actuated pivoted trip-lever L, provided with a notch, N, in its front side, the pivoted supporting-levers T, and depending arms or hangers a, secured thereto, chains U, for supporting the levers in a raised position, the rake-head journaled in the hangers and provided with catches O, to engage said notch, and the supports W, for holding the rake-teeth in an operative position, substantially as set forth.

In testimony whereof I affix my signature in presence of two witnesses.

DANIEL BOLLINGER.

Witnesses:
H. R. STAIGHT,
J. F. S. HAGEMAN.